Feb. 19, 1929.
Re. 17,220
R. F. WOOD
CASTING PROCESS AND APPARATUS
Original Filed Aug. 7. 1919
5 Sheets-Sheet 1
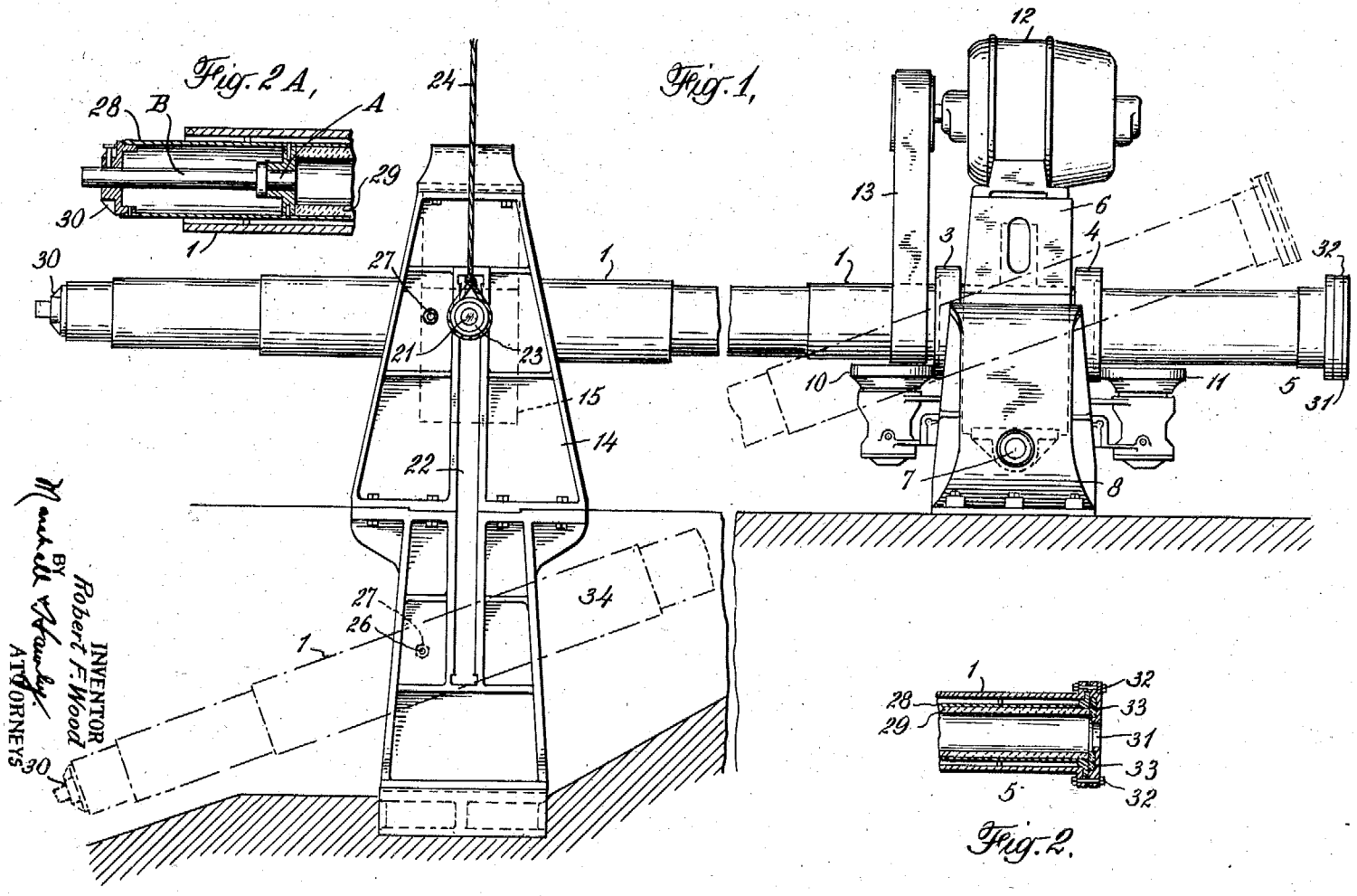
INVENTOR
Robert F. Wood
BY
Marshall & Hanley
ATTORNEYS Feb. 19, 1929. Re. 17,220
R. F. WOOD
CASTING PROCESS AND APPARATUS
Original Filed Aug. 7. 1919 5 Sheets-Sheet 2
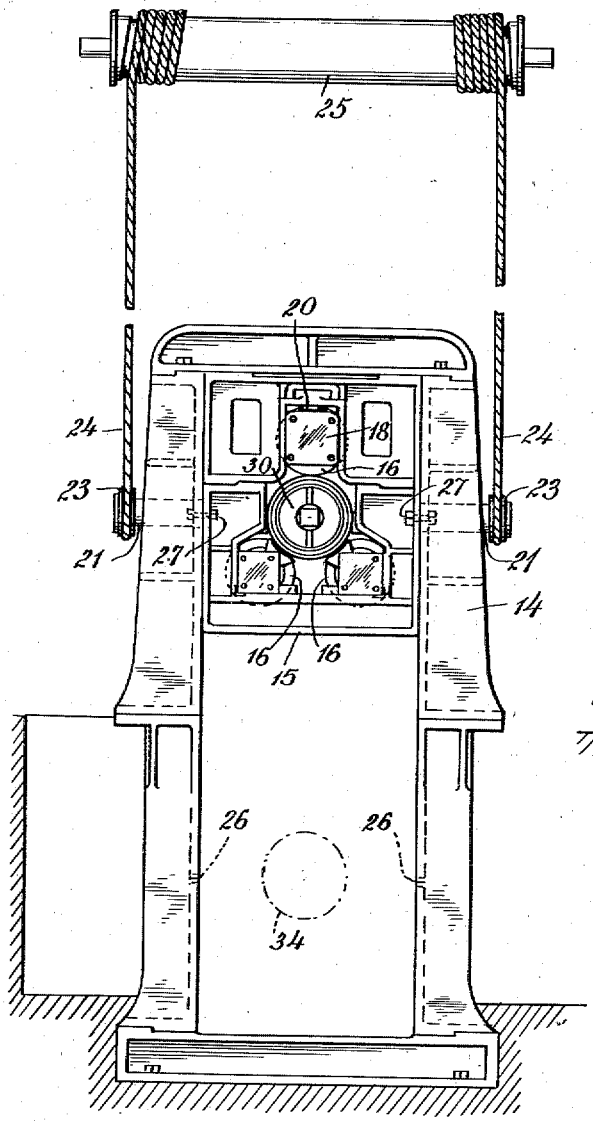
Fig. 4,
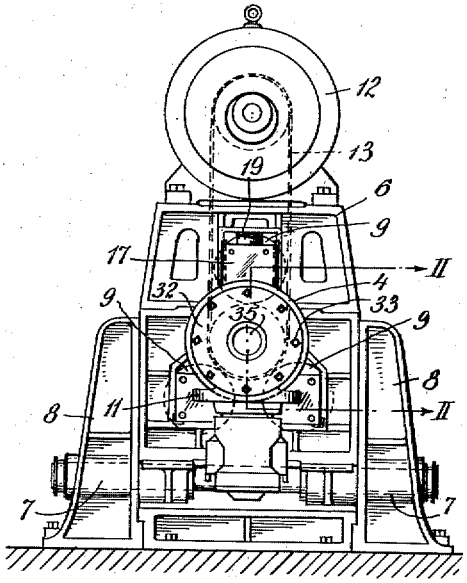
Fig. 3.
INVENTOR
Robert F. Wood,
BY
Marshall & Stanley
ATTORNEYS Feb. 19, 1929. Re. 17,220
R. F. WOOD
CASTING PROCESS AND APPARATUS
Original Filed Aug. 7. 1919 5 Sheets-Sheet 3
Fig. 5,
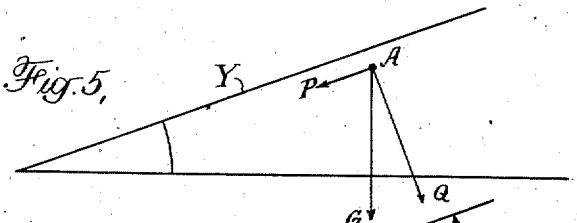
Fig. 6,
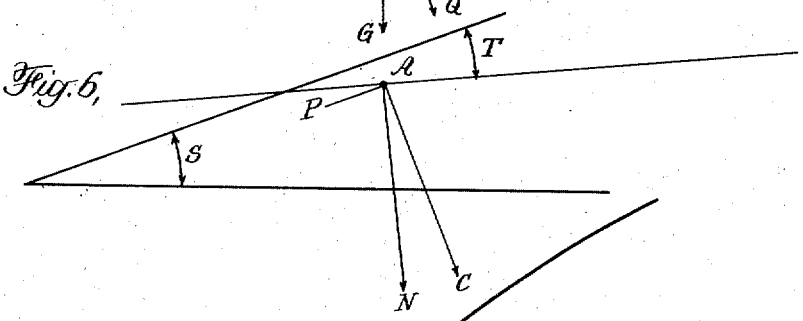
Fig. 7,
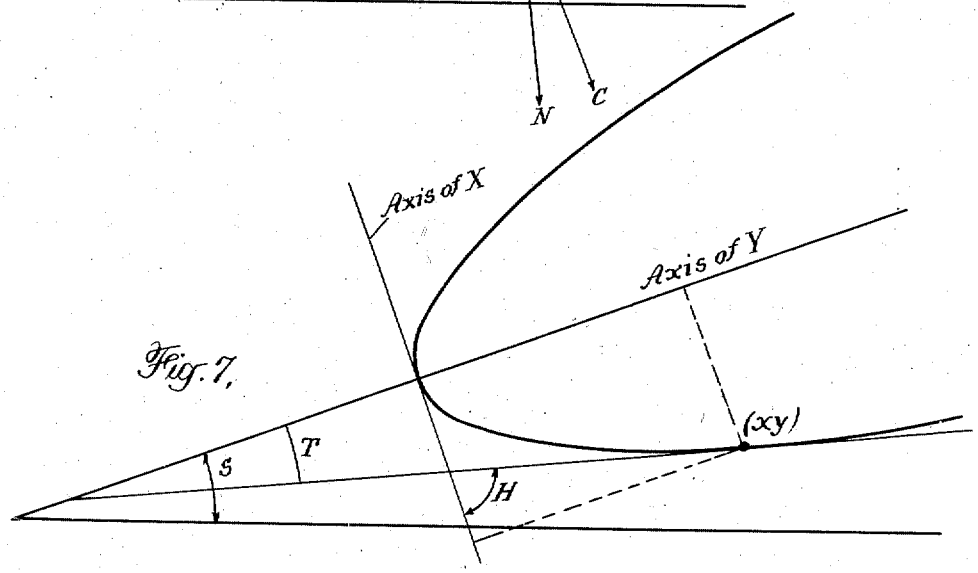
Fig. 8.
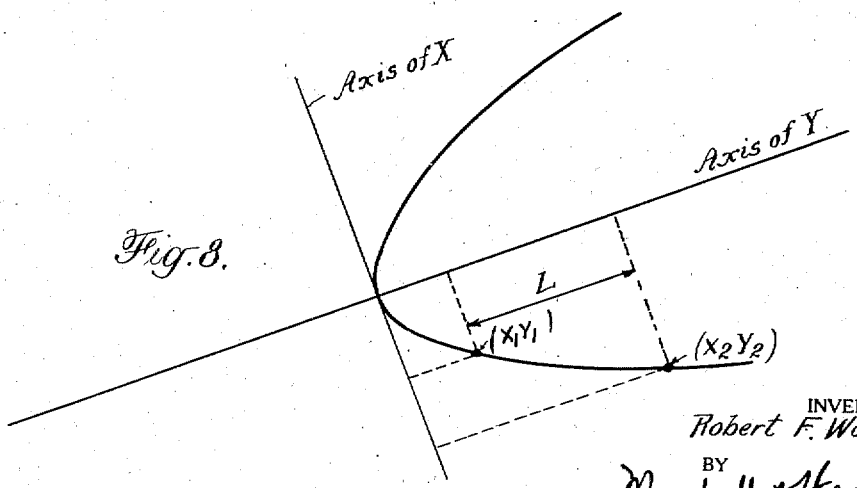
INVENTOR
Robert F. Wood
BY
Marshall & Hawley
ATTORNEYS Feb. 19, 1929.
Re. 17,220
R. F. WOOD
CASTING PROCESS AND APPARATUS
Original Filed Aug. 7. 1919 5 Sheets-Sheet 4
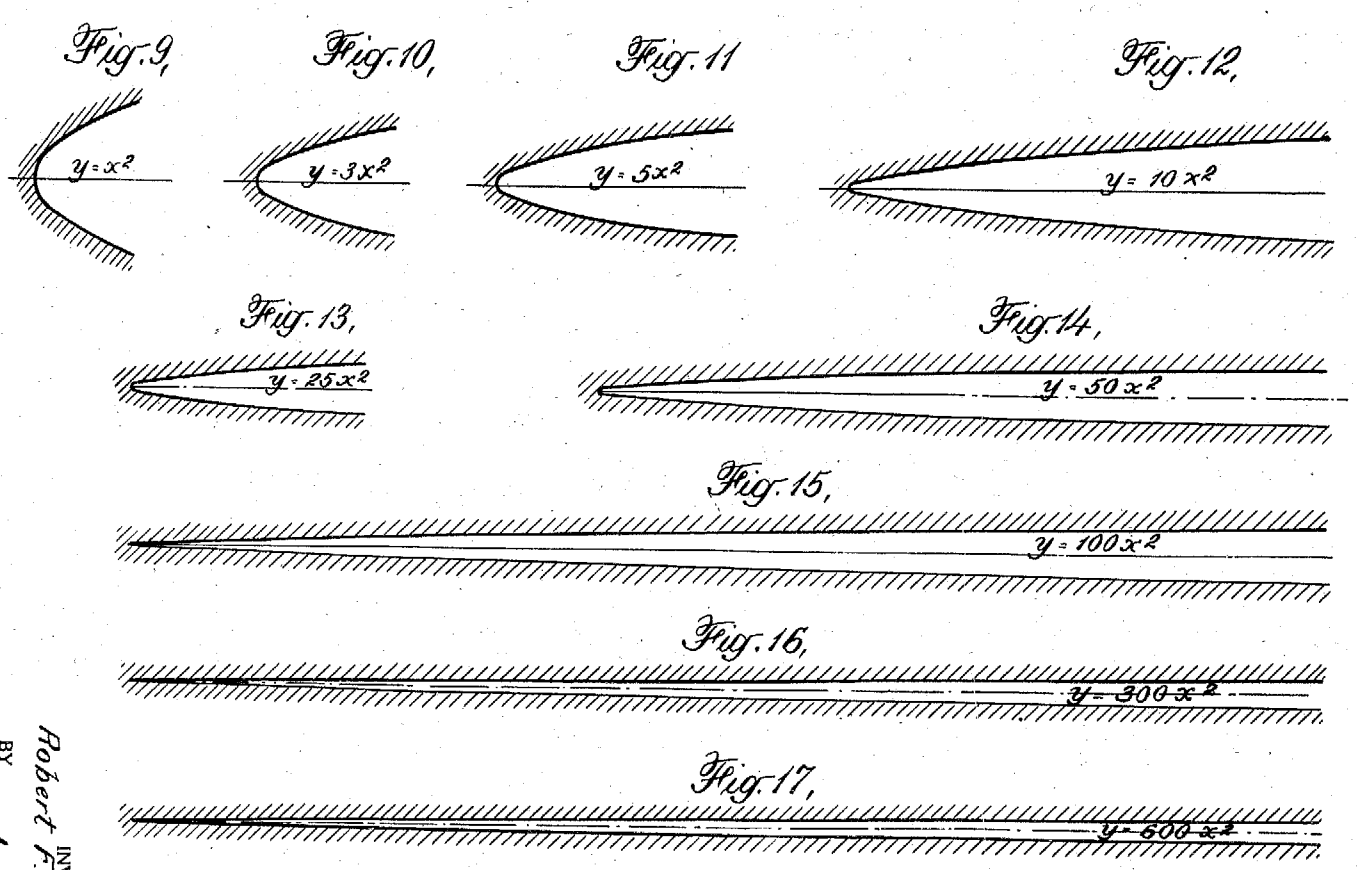
INVENTOR
Robert F. Wood
BY
Marshall & Hartley
ATTORNEYS Feb. 19, 1929.
Re. 17,220
R. F. WOOD
CASTING PROCESS AND APPARATUS
Original Filed Aug. 7. 1919 5 Sheets-Sheet 5
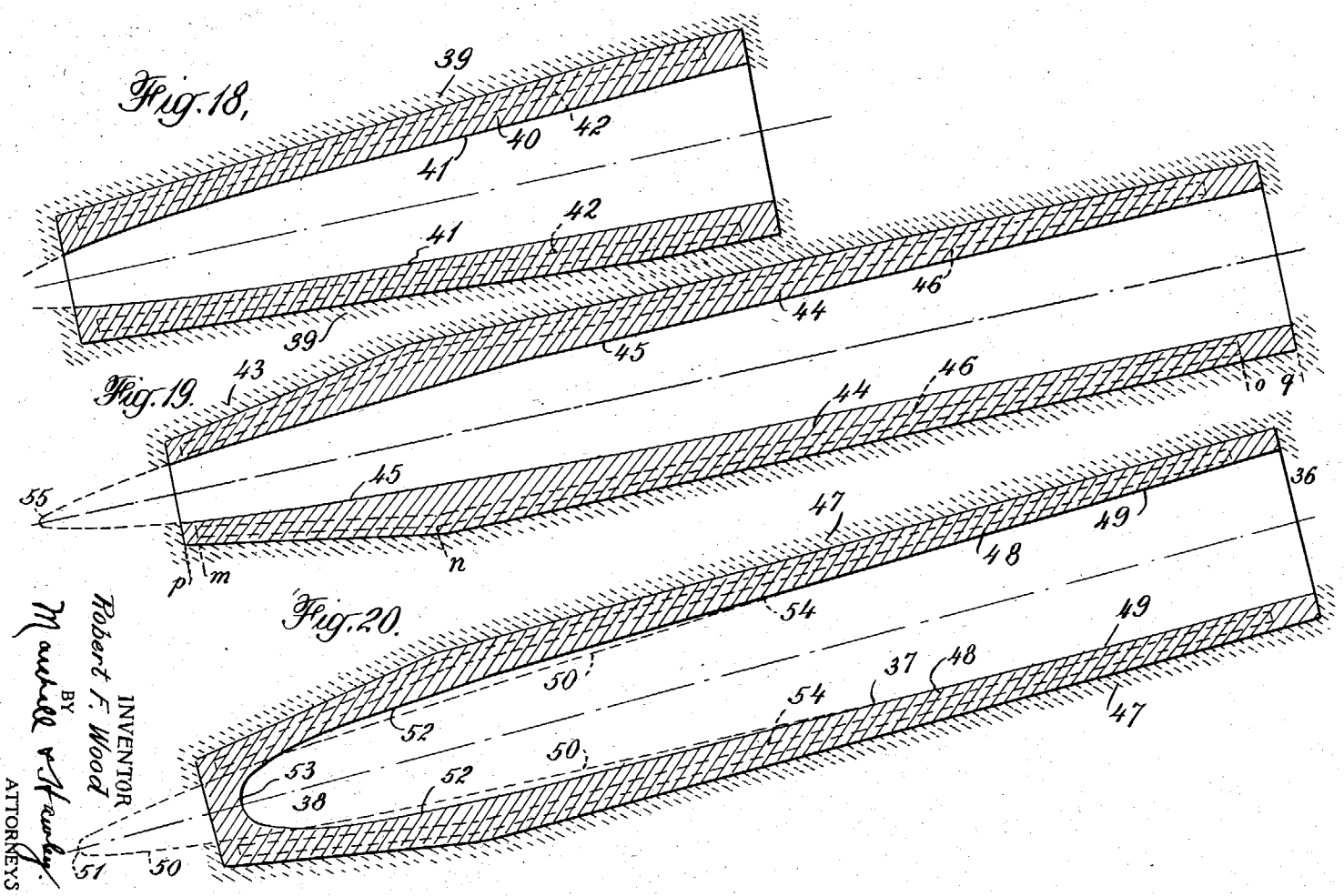
INVENTOR
Robert F. Wood
BY
Marshall & Hawley
ATTORNEYS Reissued Feb. 19, 1929. Re. 17,220

UNITED STATES PATENT OFFICE.

ROBERT F. WOOD, OF NEWARK, NEW JERSEY, ASSIGNOR TO THE PAPER & TEXTILE MACHINERY COMPANY, OF SANDUSKY, OHIO, A CORPORATION OF OHIO.

CASTING PROCESS AND APPARATUS.

Original No. 1,533,780, dated April 14, 1925, Serial No. 315,892, filed August 7, 1919. Application for reissue filed May 16, 1927. Serial No. 191,901.

My invention relates to an improved process and apparatus for making castings of metal or of other material and is particularly applicable to the making of hollow or tubular objects having non-cylindrical bores.

The object of my invention is the provision of a new and useful casting process. Other objects of my invention are: the provision of apparatus suitable for carrying out my process; the provision of a process whereby hollow or tubular castings may be produced without the use of cores of sand or of other solid material; the provision of a process for producing a casting having a paraboloidal void, from which casting there may be made, by machining in a lathe or by other process of manufacture, a hollow or tubular article whose bore or void, though not itself paraboloidal in shape, may be more or less approximated in shape and size by the paraboloidal void of the casting; the provision of a process for producing castings for submarine periscope tubes and cones; and the provision of a centrifugal process whereby a hollow or void of predetermined paraboloidal shape may be formed in casting an object without the use of solid core.

My invention is particularly useful in the production of submarine periscope tubes and cones in which it is necessary that one end be of smaller diameter than the other, and that the metal be of uniformly good quality free from blow holes, internal strains and such other imperfections as are common to tubes made by certain other methods of casting and manufacture. My invention may also be used for casting hollow projectile shells. I do not limit the uses to which my invention may be put as numerous applications will occur to those skilled in the various arts in which hollow or tubular parts are used. In the accompanying drawings I have illustrated one form of apparatus which has proved suitable for carrying out my process.

In the drawings, Fig. 1 is a side elevation of a casting machine suitable for carrying out my process;

Fig. 2 is a vertical fragmentary cross section through the upper end of the mold on line II—II of Fig. 3;

Fig. 2^A is a similar view of the other end of the mold showing its stop-off plate;

Fig. 3 is an end elevation of the front or right hand end of the machine shown in Fig. 1;

Fig. 4 is an end elevation of the rear or left hand end of the machine shown in Fig. 1;

Figs. 5, 6, 7 and 8 are diagrams for proving the theory of my process;

Figs. 9 to 17 inclusive are longitudinal sections through paraboloids generated by parabolas of different equations; and Figs. 18, 19 and 20 are longitudinal cross-sections of various castings suitable for making submarine periscope tubes.

In carrying out my process I introduce a quantity of molten metal or of other solidifiable material into a hollow mold of metal or of suitable refractory material, the quantity of molten metal being insufficient to fill the mold. The mold is preferably first inclined so that its axis makes a known angle with the horizontal, and is given a rapid rotating motion of known speed about its axis while in this inclined position. In making a metal casting the molten metal is introduced into the mold preferably while it is rotating. Under the action of centrifugal force and of gravity the metal flows and forms a hollow shell, lining the interior surface of the mold. At different speeds of rotation or at different angles of inclination of the axis of the mold, or both, bores or voids of different shapes are formed in the molten metal. I have discovered and demonstrated, however, that the shape of the hollow or void formed in the liquid or molten material is independent of the shape of the mold and is always a paraboloid of revolution or some part thereof, the shape and dimensions of which are determined by the size of the mold, its speed of rotation, the angle of inclination of the axis of rotation and the quantity of metal in the mold. I have proved mathematically and have demonstrated in practice by making numerous castings that there are definitely fixed relations between these factors; that the shape and dimensions of the hollow or bore in a casting may be calculated in advance for any given size of mold, speed of rotation, angle of inclination, and quantity of metal; and that when the size of the mold and the essential dimensions of the required hollow or bore are given, the speed of rotation of the mold, its angle of inclination, the quantity of metal to use and the shape of bore that will result may be predetermined by calculation.

It is to be understood that in these specifications the term inclined or inclination comprises any position other than horizontal up to and including ninety degrees where the axis of the mold would be vertical.

In carrying out my process, the speed of rotation of the mold and the angle of its inclination, or both, may remain constant throughout the entire period of pouring, casting and solidifying, but I do not consider that this is essential in all cases. It is evident that in order to produce a simple paraboloidal void of predetermined shape, the metal must be maintained in a state of equilibrium while it passes from the molten to the solid condition, and this state of equilibrium is most readily obtained by keeping the speed of rotation and the angle of inclination constant. However, it is conceivable that there might arise conditions under which the process by which the rough casting is subsequently to be treated or the purpose for which it is to be used would be better served if the casting process were so controlled as to modify more or less the otherwise simple paraboloidal shape of the bore of the casting. It is furthermore evident that if the speed or angle be changed at a moment when the process of solidification of the metal is as yet incomplete, the portion of the metal which has by that time already become solidified will retain its position in spite of such change in speed or angle, while the portion of the metal which is still molten or semi-molten will flow or tend to flow in such a way as to readjust itself to the new conditions, and, under them, to reach a new position and a new state of equilibrium. In my experience with the practical carrying out my process I have already encountered conditions such as I have described, and I have encountered instances in which the subsequent processes of machining the casting in a lathe were facilitated by having the otherwise simple paraboloidal shape of the bore of the casting modified in accordance with the foregoing. It is, therefore, conceivable that other instances also may arise in which the purposes or treatment of the casting will be better served by the modifications described or by other modifications similar thereto, and it is one of the advantages of my process that in practice it allows of such modifications and that the modifications admit of control because the limits of their action and effects may be predetermined by calculation by means of the equations and formulas which I have derived or by others deducible therefrom.

With the purpose in view of making castings for submarine periscope tubes and cones I first discovered by mathematical calculations that the shape of the hollow or void formed in liquid material rotating in equilibrium about an inclined axis is that of a paraboloid of revolution such as is formed by the rotation about its own axis of a parabola the equation of which may be expressed in terms of the speed of rotation of the liquid and the angle of inclination of the axis of rotation. With this fact established I deduced certain other equations which establish the relations between the speed of rotation, the angle of inclination of the axis of rotation and the shape of the paraboloid formed, from which equations the requirements for producing any desired casting which it is possible to produce by my process can be determined. I have calculated the shapes and dimensions of many castings by the equations which are herein given and have subsequently made castings in strict accordance with the conditions imposed by my calculations. I have found in every instance that the actual castings produced conformed with remarkable trueness to my advance calculations.

In Figs. 1, 2, 3 and 4 there is shown a machine which I have found suitable for carrying out my process. In these figures of the drawings, 1 represents a revoluble metal pipe or tube which is provided with suitable bearing collars 3, 4, located near its front and upper end 5. A tilting housing 6 which has trunnions 7 supported in bearings in the sides of the stationary frame 8 is provided for the support of the tube 1 and its driving motor. Radial thrust rollers 9 for rotatably supporting tube 1 are provided in the tilting housing 6. End thrust rollers 10, 11 supported by the tilting housing are provided to coact with the collars 3, 4 upon the tube 1 to retain the rotating tube 1 against longitudinal movement. A motor 12 mounted upon the tilting housing 6 is employed for rotating the tube by means of the belt 13. It will be understood that any other convenient driving means may be employed for rotating the tube 1 and that any convenient means may be used for ascertaining and controlling the speed of rotation.

Near the rear end of the tube 1 which is also the lower end when the tube is tilted, is the stationary frame or guide 14 in which there is mounted and adapted to slide vertically a housing 15, which is provided with radial thrust rollers 16 upon which the tube 1 rotates.

The uppermost rollers 9 and 16 have bearings in spring-held, adjustable boxes 17 and 18, the springs 19 and 20 serving to maintain the rollers with yielding pressure upon the rotating tube 1. The housing 15 is provided with trunnions 21 which are adapted to slide in slots 22 in the guides 14. Attached to the trunnions 21 by pivoted collars 23 are the cables 24 which extend upwardly and are connected with a device 25 for raising and lowering the rear end of the tube 1 in order to tilt the tube to the desired angle. To give added rigidity and added accuracy of setting to a known angle, holes such as 26 may be drilled through the sides of the guides 14 and the rear housing 15 and in like manner through the sides of the stationary frame 8 and the front housing 6 in such manner as to receive through-bolts such as 27 with nuts which, when drawn tight, serve to secure the several parts of the construction in perfect alinement in their inclined position.

The tube 1 is either lined with refractory material such, for instance, as a sand mold of annular cross section or, preferably, as shown in Fig. 2, receives a pipe or tube 28 having a refractory lining 29, the opening in the refractory lining being of the shape which it is desired to give to the exterior of the casting to be made therein.

The back or lower end of the mold is formed by a stop-off plate or plug A shown in Fig. 2A, set at the desired distance from the front end of the mold so as to determine the length of the casting and secured in place by a rod B that extends between it and yoke device 30. The front or upper end of the mold is formed by an annular disk or plate of metal 31 which is secured to the flanged end of the tube 1 by means of bolts 32 and which may receive a lining or facing 33 of refractory material.

In the operation of the machine to produce a casting by my process, the tube 1 has first inserted into it the pipe 28 with its refractory lining 29 which has been preheated to drive off the moisture that it may have contained. The tube 1 is then tilted to the proper angle for producing the desired casting, for instance, the angle at which the tube is shown in dotted lines at 34. The tube 1 with the pipe and its refractory lining are next brought to the desired speed of rotation by means of the motor 12 or by any other means that may be provided for the purpose, the molten metal is then introduced through the opening 35 at the upper end of the mold and is disposed by centrifugal force and gravity into the shape which it is made to assume by these forces.

The rotation is preferably continued until the metal has solidified.

The mold 28 is then removed from the tube 1 and the casting afterwards removed from the mold. It is then ready for machining or other treatment, or for use in its rough condition. Another prepared mold is then inserted in the tube and the operation repeated.

Fig. 18 shows in longitudinal section a casting suitable for making the separate cone of a submarine periscope tube. In this figure the scale of the drawing parallel to the axis of the casting is made much smaller than the transverse scale for the purpose of illustration.

Fig. 19 shows in longitudinal section a casting suitable for making a submarine periscope tube with cone and cylinder cast together in one piece, the casting being formed with a simple paraboloidal void.

Fig. 20 shows in longitudinal section a casting suitable for making a submarine periscope tube, the casting being made in the special modified manner I have elsewhere described. A portion of the void, in this case from the upper end 36 down to the point 37, is of one simple paraboloidal shape and the portion from the point 37 down to the lower or stop-off end 38 is of another paraboloidal shape. It will be observed that the void formed in the casting shown in Fig. 20 is the resulting composite of a plurality of successively formed paraboloids.

In Fig. 18 the refractory material of the mold is indicated at 39 by the area shaded in dotted section lines; the casting itself 40 is indicated in section; the paraboloidal bore formed in the process of casting is indicated by the boundary lines 41 and the outline of the finished cone which is machined all over is indicated in dotted lines at 42.

In Fig. 19 the material of the refractory mold is shown in dotted section lines at 43; the casting itself is indicated in section at 44; the paraboloidal void in the casting is indicated by the boundary lines 45 and the finished tube is indicated in dotted lines at 46.

In Fig. 20 the material of the refractory mold is indicated in dotted section lines at 47; the casting is indicated in section at 48; the upper portion of the paraboloidal void is indicated by the boundary lines 49 extending between the upper end 36 and the point 37 of the casting; the portion of the paraboloid corresponding to the boundary lines 49 which would be formed evcept for the changing of the angle of inclination or of the speed of rotation or both during the process of casting is shown by the dotted extension 50 of lines 49; the virtual vertex of the paraboloid corresponding to the boundary 49, 50 is indicated at 51; the paraboloidal void formed after changing the angle of inclination or the speed of rotation, or both, is indicated by the boundary lines 52 extending from the point 37 to the vertex 53; and the finished tube to be machined out of the casting 48 is shown in dotted lines at 54.

In Figs. 19 and 20 the longitudinal scale of the drawings is made much smaller than the transverse scale in the same manner as in Fig. 18.

In Figs. 9 to 17 inclusive of the drawings there are shown parabolas or longitudinal axial sections of paraboloids of different equations from $y=x^2$ to $y=600x^2$, the first named being very wide and shallow, such as might be used for a parabolic mirror, and the last being very narrow and deep or of small diameter relative to its length, such as would be suitable for a submarine periscope tube. These figures illustrate the wide range of castings that can be made in accordance with my invention.

In order that those skilled in the art may better understand my invention, I herein give the mathematical proof of its theory together with the derivation of the essential formulas which I have deduced which will enable anyone to calculate in advance the shape of the bore of the casting, the proper speed of rotation of the mold for any given angle of inclination of its axis or the proper angle of inclination of the mold for any given speed of rotation, and the quantity of metal required to form the casting.

The proof of the shape of the hollow or void formed in liquid material rotating about an inclined axis in a mold or receptacle having its bottom closed and its top closed as shown in Fig. 2 to within a sufficient radial distance from the axis of rotation to prevent the egress of the liquid is as follows:

Referring to Fig. 5, let A be any particle of molten metal or of other liquid material in the inclined mold, the angle of inclination of the axis Y of the mold with the horizontal being S. Let the weight of the particle be G pounds. Let P and Q be the components of G in directions respectively parallel to and at right angles to the axis of the mold and in a vertical plane through the axis. Under these conditions $$P = G \sin S.$$

The force Q may be disregarded in the present consideration because when the mold and the particle A revolve, the action of Q toward the mold becomes in each revolution alternately and equally positive and negative so that Q compensates itself relative to the mold and does not affect the position which the surface of the molten metal will assume within the mold. It may be noted here that Q is the force which determines the minimum speed at which the mold must be revolved in order to hold the metal against the sides of the mold. Considering the particle A, it will readily be understood that when A and the mold are revolving, the force Q must be overcome by the centrifugal force when A is at the highest point of its revolution in order that the particle may be prevented from falling away from the upper side of the mold.

Let us now consider the forces which act upon the particle A after equilibrium has been established and while the mold and A are rotated at constant speed about the inclined axis of the mold. A diagram of these forces is shown in Fig. 6.

Referring to Fig. 6, as the machine and the particle A revolve, A is acted upon by two forces which together determine the shape assumed by the surface of the molten metal. These two forces are P and the centrifugal force C. Their resultant is the force N whose direction, if the particle A be at a point in the surface of the metal, must be normal to the surface at that point. Therefore, a line drawn through the point A at right angles to the direction of the force N, and in the plane determined by the point A and the axis of rotation, as shown in Fig. 6, must be a tangent to the curve that is formed by the surface of the metal. This tangent will make an angle T with the direction of the axis of the mold.

From the construction, $$\tan T = \frac{P}{C}$$

As C is the centrifugal force, $$C = \frac{Mv^2}{r},$$

where M is the mass of the particle A, $v$ its velocity in feet per second and $r$ the radius of rotation in feet. Substituting in the equation for the value of tan T the values of P and C found above gives $$\tan T = \frac{G \sin S}{\frac{Mv^2}{r}} = \frac{Gr \sin S}{Mv^2}$$

Since $$\frac{G}{M} = g = 32.16,$$

or the acceleration due to gravity, $$\tan T = \frac{gr \sin S}{v^2}$$

If R be the revolutions per second, then $v = 2\pi r R$

Therefore, $$\tan T = \frac{gr \sin S}{4\pi^2 r^2 R^2} = \frac{g \sin S}{4\pi^2 R^2 r} \quad (1)$$

From Equation (1) may be found the angle T for any inclination and any speed, but only for individual radii of the bore when such are known and without determining where those radii will be formed.

In Fig. 7, let the axis of rotation be the axis Y, and X be its coordinate axis. In this figure the point A is taken at $(x, y)$, and the angles S and T are the same as before. As in Fig. 6, the straight line drawn through $(x, y)$ is, under the conditions, a tangent to the curve that forms the surface of the metal, consequently the inclination of this line to the axis X must be the slope of the curve at $(x, y)$, and that slope is equal to the tangent of the angle H.

From the construction, $r = x$.

But $$\tan H = \cot T = \frac{1}{\tan T}$$

Hence, $$\tan H = \frac{4\pi^2 R^2 r}{g \sin S}$$

The differential equation of the curve may now be written $$\frac{dy}{dx}=\frac{4\pi^2R^2x}{g\sin S}$$

from which may be derived the equation of the curve $$y=\frac{2\pi^2R^2x^2}{g\sin S}=0.61463\frac{R^2x^2}{\sin S} \quad (2)$$

This is obviously the equation of a parabola and proves that the surface of the molten metal rotating about an inclined axis is a paraboloid of revolution such as would be formed by the rotation about its axis of the parabola of the above equation, (2)

From equation, (2), the curve for any particular case may be put into the form $y=ax^2$ the constant, $a$ being equal to $$\frac{2\pi^2R^2}{g\sin S} \text{ or } \frac{0.61463R^2}{\sin S}$$

Now, if the value of $a$ be kept unchanged, then for any assigned value of R or S a corresponding value must exist for S or R. It is evident, therefore, that the equation of the curve may be made independent of both R and S, provided that other determining factors are given. This may be done as follows:

Referring to Fig. 8, let the parabola there shown be represented by the equation $y=ax^2$. The following relations hold true for any two points $(x_1, y_1)$ and $(x_2, y_2)$ located on this parabola:

$$y_1=ax_1^2 y_2=ax_2^2$$

By subtraction, $$y_2-y_1=ax_2^2-ax_1^2$$

Now $x_1$ and $x_2$ are identical to two radii, say $r_1$ and $r_2$ in the bore or void of the casting, at two different points along its axis and $y_2-y_1$ is the axial distance between them.

If $L=y_2-y_1$ the last equation may be rewritten:

$$L=a(x_2^2-x_1^2)$$

or $$a=\frac{L}{x_2^2-x_1^2}$$

Inserting this value for $(a)$ in $y=ax^2$ we have:

$$y=\frac{Lx^2}{x_2^2-x_1^2} \quad (3)$$

Equation (3) is the equation of the parabola in terms of any two radii of the bore of the casting and the axial distance between those radii, and is the equation most commonly used to determine the shape of the bore.

Equations (2) and (3) are the main equations for the solution of the problems of my process and both of these equations give identical results. Whether Equation (2) or Equation (3) or both of them should be used depends only upon the known factors or conditions which are given, from which to find the remaining conditions necessary to successfully produce the casting in practice.

*Derived equations showing relations between speed and inclination for any given parabola.*

Solving (2) for , we have $$R=1.2755\sqrt{\frac{y\sin S}{x^2}} \quad (4)$$

This may be conveniently written $$R=1.2755\sqrt{a\sin S} \quad (5)$$

Remembering also the value of $(a)$ which is used in Equation (3) we may write $$R=\sqrt{\frac{L\sin S}{x_2^2-x_1^2}} \quad (6)$$

Equation (4) gives the revolutions per second in terms of the sine of the angle of inclination, any radius of the bore expressed in feet, and the axial distance in feet of that radius from the vertex of the parabola. Equation (5) gives the revolutions per second in terms of the sine of the angle of inclination and the coefficient $a$ of $x^2$ in the equation of the parabola, and is the equation most commonly used to obtain speed and angle relations.

Equation (6) gives the revolutions per second in terms of the sine of the angle of inclination, any two radii of the bore expressed in feet, and the axial distance in feet between those radii.

Transposing (4), (5) and (6), gives the angle in terms of the revolutions per second, the other conditions corresponding exactly to those enumerated above. The corresponding values for the angles follow:

$$S=\sin^{-1}\left(0.61463\frac{R^2x^2}{y}\right) \quad (7)$$

$$S=\sin^{-1}\left(0.61463\frac{R^2}{a}\right) \quad (8)$$

$$S=\sin^{-1}\left[0.61463R^2\frac{(x_2^2-x_1^2)}{L}\right] \quad (9)$$

*Volume computations.*

To obtain the volume of metal needed to make a given casting, the volume of the void may be deducted from the total volume of the mold. The volume of the mold may be found by adding together the volumes of its parts. If the frustum of a cone enters into this, the following volume formula may be used:

$$\frac{h}{3}\left(A_1+A_2+\frac{\pi d_1 d_2}{4}\right) \quad (10)$$

where $A_1$ and $A_2$ are the areas of the two bases, $h$ is the altitude of the frustum and $d_1$ and $d_2$ are the diameters of the two bases respectively.

The volume of the void will be the volume of so much of the paraboloid as is contained between the front and back ends of the mold. The position of the vertex of the paraboloid relative to the back end of the mold is preferably to be first known and may be found by making the proper substitutions in Equation (2) or Equation (3) or, better, directly in the equation $y=ax^2$ after ($a$) is known.

If V represents the volume of the paraboloid between the front and back ends of the mold when the vertex lies behind the back end of the mold, then $$V=\frac{1.5708}{a}(y_2^2-y_1^2) \quad (11)$$

If the vertex lies within the mold, $y_1$ becomes zero and $$V=\frac{1.5708}{a}(y_2^2) \quad (12)$$

To illustrate the practical application of these equations to the determination of the conditions that should be observed in making a casting by my process, I herein show the solution of a concrete case such as might occur in practice.

Referring to Fig. 19 of the drawings, let it be required to provide a casting from which to make a submarine periscope tube such as is shown in dotted outline and longitudinal section at 46. Let the finished dimensions of the required tube be: outside diameter 4 inches at $m$, and 6½ inches at $n$ and $o$; over-all length 14 feet, for 10 feet of which, from $o$ to $n$, the tube is to be cylindrical, and for the remaining 4 feet, from $n$ to $m$, uniformly tapered; wall thickness, ½ inch. In order to produce a finished tube conforming to these measurements, let there be required a rough casting such as is indicated at 44 in Fig. 19, of the following dimensions: outside diameter 4¼ inches at $p$ and $m$, and 6¾ inches at $n$, $o$ and $q$; inside diameter 2¾ inches at $p$, and 5¼ inches at $q$; over-all length 14 feet 6 inches, of which 14 feet is the length of the finished casting, 2 inches an extra allowance in length at the small end $p$, and 4 inches an extra allowance in length at the large end $q$.

Examination of the data discloses that for this casting the measurements given are reducible to the requirements of Equation (3), viz, two radii of the bore and the axial distance between them. Expressed in feet the radii of the desired inside diameters, 2¾ and 5¼ inches respectively, will be $x_1=0.1146$ ft., and $x_2=0.2187$ ft., and the length L of the casting equals 14.5 ft. Introducing these values into equation (3):

$$y=\frac{14.5x^2}{0.2187^2-0.1146^2}=418x^2$$

hence $y=418x^2$ is the equation of a parabola which, if revolved about its axis would generate a paraboloid, part of which would be of the shape and size of the bore which would be obtained in the rough casting.

It now remains to fix the speed and angle relations, which may be done through either Equation (5) or (8). If the angle of inclination be assigned, Equation (5) will determine the speed of rotation while if the speed of rotation be assigned, Equation (8) will determine the angle of inclination. In either case the value of $a$ 418, as found above, will also be used. Accordingly if the assigned angle of inclination be 10 degrees, its sine, 0.1736, and the value 418, found for $a$, may be substituted in Equation (5), yielding $$R=1.2755\sqrt{418\times0.1736},$$

whence R, the revolutions per second equals 10.87 and the revolutions per minute equals 652, which would be the speed of rotation corresponding to a mold inclination of 10 degrees.

Conversely, if the assigned speed of rotation be 600 revolutions per minute, R, or the number of revolutions per second, becomes 10.00. This with the value, 418, of $a$ may be substituted in Equation (8), yielding $$S=\sin^{-1}(0.61463)\frac{(10^2)}{418} \text{ or } S=\sin^{-1}0.14704$$

Whence $S=8°-27'$, which would be the mold inclination corresponding to a speed of rotation of 600 revolutions per minute.

To determine the volume of the mold, the volume of the parts may be determined separately and then added together:

| | Cubic inches. |
|---|---|
| $p$ to $m$ (cylinder) | 28 |
| $m$ to $n$ (frustum of cone) | 1160 |
| $n$ to $q$ (cylinder) | 4437 |
| Total volume of mold | 5625 |

To determine the volume of the bore of the casting, Equation (11) may be used. The values of $y_1$ and $y_2$ may be found by substituting back into $y=418\ x^2$ the values of $x_1$ and $x_2$ already used, 0.1146 and 0.2187 respectively. Accordingly, $$y_1=418\times0.1146^2=5.5$$
$$y_2=418\times0.2187^2=20.0$$

It may be noted here that $y_1$, or 5.5 feet is the distance from the back or smaller end of the casting to the virtual vertex of the paraboloid, as from $p$ to 55 in Fig. 19, and that having found it, the value of $y_2$ may be determined by adding to it L, or 14.5 feet, giving 20.0 feet, which is identical, as it should be, to the value obtained by substitution.

From these values, and the value of $a$, by Equation (11).

$$V=\frac{1.5708}{418}(20.0^2-5.5^2)=1.3895$$

This is in cubic feet, and is equal to 2401 cubic inches.

To determine the quantity of metal in the rough casting, its volume may first be found, and then its weight. Its volume may be obtained by finding the difference between the volumes of the mold and of the bore, 5625 and 2401 cubic inches respectively, or 3224 cubic inches. If the weight per cubic inch of the metal employed be 0.30 pound, the weight of the casting would then be 3224 times 0.30 pound, or 967 pounds.

In using my process the specific gravity of the material from which a casting is to be made is a matter of indifference so far as concerns the relations between the speed of rotation, the angle of inclination, and the shape of the bore of the casting. Whether aluminum, lead, or any other substance be used, is, therefore, a matter of indifference everywhere in the computations, except only in the operation of deducing the weight of the casting from the value found for its volume, at which point, obviously, a correct value for the weight per unit of substance should be used. The proof that these relations and the equations representing them are thus independent of the specific gravity of the material is seen in the derivation of Equation (1) where the mass, M, of the particle, has been shown to disappear.

Having thus described my invention, I claim and desire to secure by Letters Patent:

1. In apparatus for casting metal tubes and the like having paraboloidal hollow bores, a mold the interior of which has the desired form of the exterior of the casting, means for rotating said mold at the requisite speed and means for giving to the axis of said mold the requisite inclination to produce within the casting a cavity of the desired paraboloidal form.

2. In apparatus for casting metal tubes and the like having paraboloidal hollow bores formed under the joint action of centrifugal force and gravity, a revoluble mold, a support therefor, bearings for said revoluble mold carried by said support, and means for revolving said mold, the axis of rotation of said mold being inclined to the horizontal.

3. In apparatus of the class described, a mold revolubly mounted in a tilting housing, a motor mounted on said tilting housing, driving connections between said motor and said mold, and means for tilting said mold and said housing.

4. In apparatus of the class described, a mold revolubly mounted in a housing, a support for said housing, a motor mounted on said housing in driving connection with said mold, and means for tilting said mold and said housing.

5. In apparatus of the class described two stationary supports, a tilting housing mounted on one of said supports, a vertically adjustable tilting housing mounted upon the other of said supports, and a revoluble mold carried in bearings in said housings.

6. In apparatus of the class described, a stationary support, a tilting housing mounted on said support, a vertically adjustable tilting housing, a revoluble mold carried in bearings in said housings, and means for rotating said mold.

7. In apparatus of the class described, a stationary support, a tilting housing mounted on said support, a vertically adjustable tilting housing, a revoluble mold carried in bearings in said housing, means for rotating said mold about its axis and means for inclining said axis of said mold.

8. In apparatus of the class described, a stationary support, a tilting housing mounted upon said support, a vertically adjustable tilting housing, a revoluble mold carried in bearings in said housings, means for rotating said mold about its axis, means for inclining said axis of said mold, and means for securing said vertically adjustable housing in its adjusted position.

9. In apparatus of the class described, a revoluble mold, two bearings for said mold, one of said bearings being mounted for tilting about an axis transverse to the axis of rotation of said mold and the other of said bearings being mounted for tilting about an axis transverse to the axis of rotation of said mold, and means for vertically adjusting one of said bearings.

10. In apparatus of the class described, a revoluble mold, two bearings for said mold, both of said bearings being provided with trunnions having their axes transverse to the axis of rotation of said mold, one of said bearings being vertically adjustable.

11. In a centrifugal casting machine, an elongated revoluble mold, bearings therefor, horizontally spaced bearing supports and adjustable means whereby said bearings may be so held in their supports in different vertical relations as to give the desired inclination to the mold.

12. The process of forming a plurality of paraboloidal voids in objects cast from molten metal or other solidifiable fluid material which consists of placing a quantity of said fluid material in a hollow mold, the volume of said fluid material being insufficient to fill said mold, imparting a rotating movement to the fluid material in said mold whereby a paraboloidal void is formed in said material about the axis of rotation thereof, continuing the rotation of the material in this position until a portion of the material is solidified, then inclining the axis of rotation from the position it has thus far maintained and continuing the rotation of the material until another portion of it has solidified.

13. The process of forming hollow tubular objects which consists of imparting to a quantity of solidifiable fluid material a rapid rotating movement about an inclined axis, limiting the radial movement of said material so that it forms within such limits a hollow shell of non-uniform inside diameter, the internal cavity of said shell being a paraboloid symmetrical with the axis of rotation, continuing the rotation of the material about said inclined axis until a portion of the material has solidified, then changing the inclination of said axis and continuing the rotation of the material until another portion of it is solidified.

14. The process of forming hollow tubular objects which consists of imparting to a quantity of solidifiable fluid material a rapid rotating movement about an axis, confining the said material within radial limits but permitting it to flow longitudinally of said axis so that due to said rotation it forms within said radial limits a hollow shell of non-uniform diameter, the internal cavity of said shell being a paraboloid symmetrical with the axis of rotation, continuing said rotation at a constant speed until a portion of said material is solidified, then changing the speed of rotation and continuing it at said changed speed until another portion of the material has solidified.

15. The method of making periscope tubes or the like of cast metal which consists of centrifugally casting a long paraboloidal void in a metal cylinder the contour of the longitudinal cross section of said void approximating the desired contour of the finished tube with allowance for internal finish, and subsequently finishing the inner surface to the desired dimensions and contour.

16. In a centrifugal casting machine, a revoluble hollow shaft, bearings supporting said shaft, said bearings being adjustable to incline the axis of said shaft, a hollow mold in said shaft, the axis of said shaft and said mold coinciding, said shaft and said mold being open at their upper ends, and driving means for said shaft.

17. In a centrifugal casting machine, a revoluble hollow shaft, bearings supporting said shaft, said bearings being adjustable to incline the axis of said shaft, a hollow mold in said shaft, the axis of said shaft and said mold coinciding, said shaft and said mold being open at their upper ends, and driving means for said shaft operable to drive the same in any of its adjusted positions.

18. In a centrifugal casting machine, a rotatable hollow shaft pivoted for tilting movement on an axis transverse thereto and adjacent one end thereof, a housing arranged to tilt with said shaft, a motor on said housing operatively connected to rotate the shaft, and a hollow mold in said shaft adapted to receive molten metal and to form a casting therein.

19. In a centrifugal casting machine, a rotatable hollow shaft pivoted for tilting movement on an axis transverse thereto and adjacent one end thereof, a housing arranged to tilt with said shaft, a motor on said housing operatively connected to rotate the shaft, and a hollow mold insertable in one end of said shaft adapted to receive molten metal and to form a casting therein, and means adjacent the other end of the pivoted shaft for raising and lowering the shaft on its pivot.

20. In a centrifugal casting machine, a rotatable hollow shaft pivoted for tilting movement on an axis transverse thereto and adjacent one end thereof, a housing arranged to tilt with said shaft, a motor on said housing operatively connected to rotate the shaft, and a hollow mold insertable in one end of said shaft and removably mounted therein adapted to receive molten metal and to form a casting therein, and means adjacent the other end of the pivoted shaft for raising and lowering the shaft on its pivot.

In witness whereof, I have hereunto set my hand this 29th day of April, 1927.

ROBERT F. WOOD.